Patented July 20, 1926.

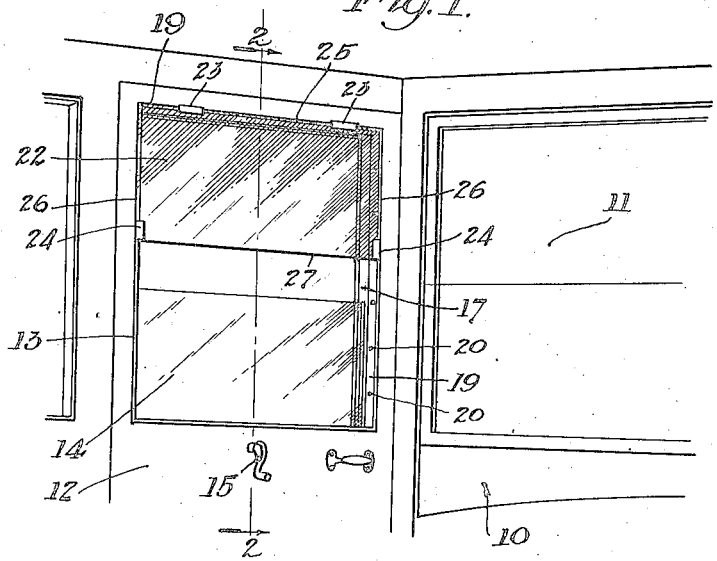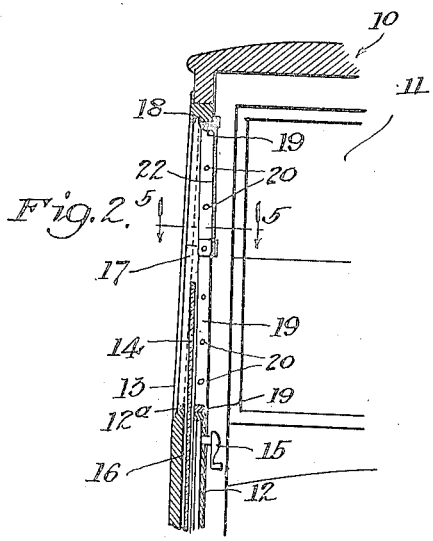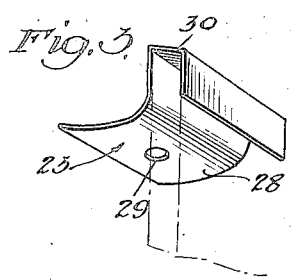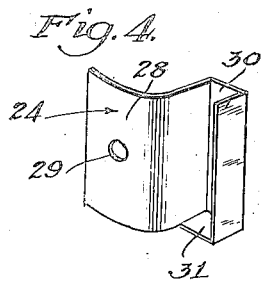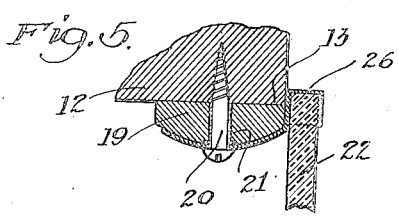

1,593,187

UNITED STATES PATENT OFFICE.

JOHN A. MATHIS, OF LOS ANGELES, CALIFORNIA.

SUN AND RAIN SHIELD FOR VEHICLES.

Application filed April 14, 1923. Serial No. 632,112.

My invention pertains, generally, to shields to be applied to vehicles, and, particularly, it pertains to a shield formed of colored glass which is adapted to be secured to the doors of enclosed motor vehicles for the purpose of, first, protecting the eyes of the occupants from the glare of the sun, and, second, to shield them from wind and rain.

The foremost object of my invention is the provision of such a shield which may be removably mounted within the window opening of the front door of an enclosed vehicle, adjacent the driver's seat, to protect the eyes of the driver from the sun's glare; and for this purpose it is mounted in the opening to extend downwardly from its top to a point about midway of its height. And, it is particularly designed for mounting upon the window openings of the doors of enclosed vehicles, and to be used in combination with the glass panels of such doors which ordinarily are mounted to be opened by lowering them into the lower section of the door.

It is very common to provide enclosed motor vehicles with sun and rain visors which extend across the front glass panels, but it is not practicable to mount such visors upon the doors of the vehicles owing to the necessity for opening and closing them. For this reason I have designed the present sun and rain shield, and it accomplishes the same purposes upon the door of the vehicles as the sun and rain shields now commonly mounted upon the front glass panels.

As practically all enclosed vehicles have adopted the window construction for their doors, in which the glass panels are opened by lowering them from the top; and as practically all States have adopted laws requiring the operators of such vehicles to indicate changes in direction of travel by means of signalling from the side of the vehicle with the arm, it is, therefore, necessary for the glass panel in the door adjacent the driver's seat to be lowered sufficient for the driver to give these signals through the window opening. This necessitates the glass panel being lowered to practically its limit, and in inclement weather little or no protection is afforded the driver of the vehicle. Therefore, in addition to serving as a sun and rain shield my device is so mounted in the window opening as to extend downwardly from its top to a point about midway of its height, and in inclement weather the glass panel of the door may be raised to a point to leave only a small space between its top edge and the lower edge of my shield panel, thereby providing a slot through which the arm may be extended for signalling and yet forming a substantial enclosure for the window opening. My shield member is to be thus used in combination with the sliding panels of vehicle doors now in common use, and, as will be later explained, will not in any way interfere with the normal operation of the latter.

The merits of my invention will be more fully set forth in the following specification, reference being made therein to the accompanying drawings, illustrating the preferred form, and in which:

Fig. 1 is a fragmentary perspective view showing a portion of an enclosed motor vehicle from the interior thereof, and illustrating the application of my invention to the forward door adjacent the driver's seat;

Fig. 2 is a transverse vertical section, taken as indicated by line 2—2 on Fig. 1;

Fig. 3 is a full sized perspective view of one of the top panels supporting brackets;

Fig. 4 is a perspective view of one of the bottom panels supporting brackets; and Fig. 5 is a transverse section taken as indicated by the line 5—5 on Fig. 2.

Referring now to the drawings the numeral 10 designates, generally, a fragmentary portion of an enclosed motor vehicle body; 11 the front glass panels therein, commonly termed the wind shield; and 12 the forward door adjacent the driver's seat, here shown to be on the left side.

The door 12 is shown to be of typical construction, having a window opening 13 in its upper portion. A panel 14 of clear glass is mounted vertically movable in the door 12, and which may be raised and lowered in any well known manner as by means of a crank 15. When lowered the panel 14 disappears into a space 16 in the lower portion of the door 12; its vertical edges sliding in slots or recesses 17 in the vertical sides of the door. When raised to closed position the panel is supported in position upon the top edge of the door portion 12ª, with its top edge extending into a slot 18 in the top of the door, as illustrated in dotted lines in Fig. 2.

A finish strip or bead 19 is secured around the opening 13, intermediate the slot 17 and the inner face of the door 12, as by means of suitable screws 20. Ordinarily these screws extend through metal bushed bores 21 therein, so that they may be easily and conveniently removed for removing the panel 14 from the door. I take advantage of this feature and utilize the screws 20 for mounting my panel 22 in the following manner:

Brackets 23 and 24, which are preferably stamped out of a light sheet metal, are provided for supporting the panel 22 in place; the brackets 23 being adapted to engage the top edge 25 of the panel, and the brackets 24 being adapted to engage the end edges 26 as well as the bottom edge 27. The brackets 23 and 24, are identical with the exception of a slight structural difference which will be later pointed out. They each have a body portion 28 bent to conform to the surface configuration of the beads 19 in which an aperture 29 is provided through which screws 20 extend for mounting them upon the door, as clearly illustrated in Fig. 5. The body portion 28 is right angularly bent to terminate in a channel portion 30 formed to engage the edge of the panel 22.

As hereinbefore stated, the brackets 28 are adapted to be mounted in the opening 13 upon the beads 19, to engage the top edge 25 of the panel 22, while the brackets 24 engage its end edges and also its bottom edges for supporting it in place. For the latter purpose the brackets 24 are provided with end walls 31 extending across their channels, as clearly illustrated in Fig. 4, so that the channels will engage over the end edges of the panel 22 and the end walls 31 will engage the bottom edge 27 to support the panel in place.

The panel 22 may be constructed of any suitable material, but will preferably be formed of a heavy colored glass, such as green or amber, to be effective in shielding the eyes of the driver against the sun's glare, yet be perfectly transparent.

In use the panel 22 will be ordinarily mounted in the upper portion of the window opening 13, in the door adjacent the driver's seat, as illustrated in Fig. 1. While it is designed to be removably mounted in this opening it will ordinarily be more or less permanently fixed in place. The brackets 23 and 24 are designed to support this panel adjacent the inner face of the door, as illustrated in Fig. 2, so that it will not in any way interfere with the normal use and operation of the panel 14. Under usual circumstances the panel 14 will be lowered into the door 12 to permit arm signals being freely given by the driver through the lower portion of the window opening, but in inclement weather this lower portion 14 may be raised to approximately the position illustrated in Fig. 1, so as to leave a space between the lower edge of the panel 22 and its upper edge sufficient for the extension of the arm therethrough for signalling and yet afford ample protection to the driver against the rain and wind.

The panel 22 may be extended downwardly to any desired point, but under ordinary circumstances its bottom edge will extend to a point on line with the driver's eyes or slightly below. Thus it will be seen that I have not only provided a non-glare shield which when used on enclosed motor vehicles will afford ample protection to the driver's eyes, yet not interfere in any way with his vision of his surroundings, but I have also provided a rain and wind shield which may be used in combination with the sliding glass panel of such vehicle doors, to permit signalling yet shield the driver against the ravages of the weather. And, while I have described a preferred specific form of my device, it is, nevertheless, to be understood that I reserve the right to make such changes or modifications in the structure as will properly come within the scope of the appended claim.

Having described my invention, I claim:

The combination with a vehicle door having a window opening therein and a panel slidably mounted in said opening to lower from the top, of a transparent sun and rain shield member mounted in said opening adjacent its top and extending downwardly about midway of its height, securing members removably secured to the door and having channel portions adapted to engage the upper edges of said panel, and similar members having angular channel portions adapted to engage the angular edges of said panel at its lower corners to support it and hold it in place.

In witness that I claim the foregoing I have hereunto subscribed my name this 21st day of March, 1923.

JOHN A. MATHIS.